United States Patent [19]

Irland

[11] Patent Number: 4,696,331
[45] Date of Patent: Sep. 29, 1987

[54] FIXTURE FOR A ROUTER

[76] Inventor: Thomas E. Irland, 5118 Artistic Cir., Colorado Springs, Colo. 80917

[21] Appl. No.: 875,888

[22] Filed: Jun. 19, 1986

[51] Int. Cl.$^4$ .............................................. B27C 5/10
[52] U.S. Cl. .......................... 144/134 D; 144/136 C; 409/182
[58] Field of Search ................... 409/182; 144/134 R, 144/134 D, 136 R, 136 C

[56] References Cited

U.S. PATENT DOCUMENTS

| 2,795,249 | 6/1957 | Zern | 144/134 D |
| 3,099,299 | 7/1963 | Gilfry . | |
| 3,212,541 | 10/1965 | Burrows et al. | 144/134 D |
| 3,285,135 | 11/1966 | Shaw | 144/136 C |
| 3,450,001 | 6/1969 | Fortune . | |
| 3,559,704 | 2/1971 | Thompson . | |
| 3,774,279 | 11/1973 | Hunter | 144/134 D UX |
| 3,782,431 | 1/1974 | Cox . | |
| 4,044,805 | 8/1977 | Gronholz | 144/134 D |
| 4,566,512 | 1/1986 | Wilson | 144/134 D |

FOREIGN PATENT DOCUMENTS 1223524  8/1966  Fed. Rep. of Germany ... 144/134 D

Primary Examiner—W. D. Bray
Attorney, Agent, or Firm—Henderson & Sturm

[57] ABSTRACT

A fixture for a router for permitting one end of a finishing tool extending therethrough to be moveable along a radius edge of a countertop for trimming such edge off of the countertop. The fixture includes a base member adapted to be attached to the front surface of a router housing and includes a central front flange rigidly connected to the base member and extending from the base member out toward one end of the finishing tool. Because of the configuration of the fixture, there will be a clearance between the outer edge of the front surface of the router housing and the countertop when the rounded front edge of the central flange is moved along the radius of the countertop while a cylindrical guide surface on the front end of the finishing tool is on the top of the countertop and the cutting edge of the finishing tool trims off a portion of the top front edge of the countertop.

2 Claims, 5 Drawing Figures

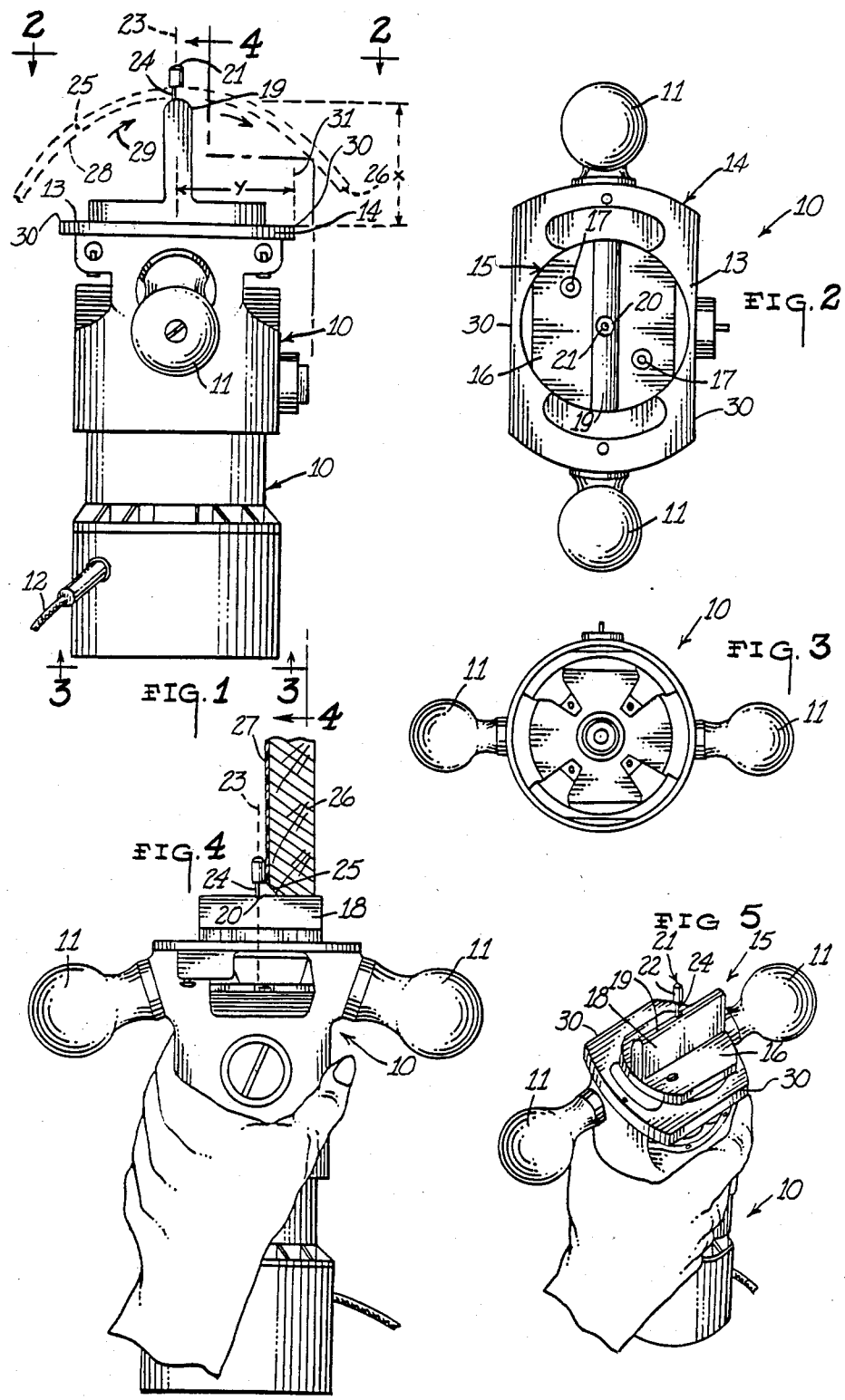

FIXTURE FOR A ROUTER

TECHNICAL FIELD

The present invention relates generally to routers and more particularly to a fixture for a router which allows precision routing of curved surfaces such as the top of a counter where a curved surface connects counters extending perpendicular to one another.

BACKGROUND ART

When counters, such as those commonly found in kitchens, are formed, it is usually necessary to trim off the front top edge thereof to eliminate any roughness and to make counter more aesthetically pleasing. These counters can be made of many different materials, but they are often made of wood and are sometimes made of wood with a plastic laminated to the top thereof. An ordinary router such as that shown in U.S. Pat. No. 3,099,299 can be utilized to trim the front top edge of a counter by use of solid carbide seven degree (7°) finishing tool, for example. Of course other degrees of taper on the finishing tool may be used instead. Such a finishing tool is generally shown in the instant drawings, for example. While it is no problem to trim the straight edges of the top front edge of a counter top, curved edges, such as where two counters come together, do present a problem because the front surface of the router housing interferes with getting the finishing tool in where it needs to be, while still guiding the finishing tool along the front edge of such curved surface.

Accordingly, there is a need for a fixture for a router which will overcome the aforementioned problem.

DISCLOSURE OF THE INVENTION

The present invention relates to a fixture for a router for permitting one end of a finishing tool extending therethrough to be moveable along a radius edge of a countertop for trimming such edge off of the countertop. The fixture includes a base member adapted to be attached to the front surface of a router housing and includes a central front flange rigidly connected to the base member and extending from the base member out toward one end of the finishing tool. Because of the configuration of the fixture, there will be a clearance between the outer edge of the front surface of the router housing and the countertop when the rounded front edge of the central flange is moved along the radius edge of the countertop while a cylindrical guide surface on the front end of the finishing tool is on the top of the countertop and the cutting edge of the finishing tool trims off a portion of the top front edge of the countertop.

An object of the present invention is to provide a fixture for a router which will allow for fast and efficient routing of a female radius on all styles of countertops and/or plastic laminated surfaces.

Other objects, advantages, and novel features of the present invention will become apparent from the following detailed description of the invention when considered in conjunction with the accompanying drawings.

BRIEF DESCRIPTION OF THE DRAWINGS

FIG. 1 is a top plan view of a router having the fixture of the present invention attached thereto and having a finishing tool extending out therefrom when in use in trimming or routing a curved surface formed about a radius;

FIG. 2 is a view taken along line 2—2 of FIG. 1 but not showing the countertop being routed;

FIG. 3 is a view of the router of FIG. 1 taken along line 3—3;

FIG. 4 is a view taken along line 4—4 of FIG. 1; and

FIG. 5 is a perspective view of the router, fixture and finishing tool.

BEST MODE FOR CARRYING OUT THE INVENTION

Referring now to the drawings wherein like reference numerals designate identical or corresponding parts throughout the several views, FIG. 1 shows a router (10) having handles (11) attached thereto and a power cord (12) extending from the housing of the router (10). A front surface (13) of a front router plate (14) can readily be seen in FIG. 2. The fixture (15) of the present invention has a base member (16) which can be bolted by bolts (17) to the top surface (13) of the front plate (14) of the router (10). The fixture (15) has a central flange (18) rigidly attached thereto, which is preferably formed in one piece with the base member (16). This central flange (18) has a curved front portion (19) thereon as can best be seen in FIG. 1. A central opening (20) extends completely down through the central flange (18) and through the base member (16).

A finishing tool, such as a solid carbide seven degree (7°) finishing tool (21), extends through the opening (20) and is attached at the other end thereof to the router in a conventional fashion, such as by a collett. The finishing tool (21) has a cylindrical end (22) thereon formed symmetrically around the longitudinal axis shown by the dashed line (23) in FIGS. 1 and 4. A cutting edge (24) on the finishing tool (21) will cut the front top edge (25) to the position shown in FIG. 4 or to any other degree desired depending upon the angle of the finishing tool chosen to be used. In FIG. 4 the angle is shown slightly exaggerated from the use of a seven degree (7°) finishing tool, but this exaggeration is for illustration purposes only. The cutting angle on the bit or finishing tool is strictly one of choice of the operator.

The fixture (15) allows one end of the finishing tool (21) to be movable along a radius edge (28) of a countertop (26) for trimming an edge off of such countertop (26). The fixture (15), including a base member (16), is adapted to be attached to the front surface (13) of the router housing (14). A central flange (18) is rigidly connected to the base member (16) and extends from the base member (16) toward one end of the finishing tool (21). An opening (20) is disposed in a central portion of the base member (16) and extends through a central portion of said central flange (18). The central flange (18) has a rounded front end (19) thereon adjacent to the cutting edge (24) of the finishing tool (21). The distance of "x" (FIG. 1) of the rounded front end (19) of the central flange (18) from the front surface (13) of the router housing (10,14) is greater than the distance "y" of the outer edge (30) of the front surface (13) of the router housing (10,14) from the longitudinal axis (23) of the finishing tool (21) whereby there will be a clearance between the outer edge (30) of the front surface (13) of the router housing (10,14) and the countertop (26) when the rounded front end (19) of the central flange (18) is moved along the radius edge (28) of the countertop (26) while the cylindrical guide surface (22) is on top of the countertop (26) and the cutting edge (24) trims off a portion of the top front edge (28) of the countertop.

In operation of the present invention, the router (10) would be placed on the top of a counter (26) which could have a plastic laminated surface (27) thereon if desired. A cylindrical portion (22) will ride smoothly on the top of the laminated portion (27) and serve as a guide. At the same time, the end portion (19) of the fixture (15) will firmly be positioned and butt the edge of (28) of the countertop (26) as is shown in FIGS. 1 and 4. In this position as the router is moved in the direction of the arrows (29) as shown in FIG. 1 while at the same time the router (10) is rotating the finishing tool (21), the cutting edge (24) will cut down the edge (25) as shown in FIGS. 1 and 4. It can readily be appreciated from viewing FIG. 1 that if the fixture (15) were not present and the bit or finishing tool (21) were merely sticking out the front of the router (10), a steady cutting pressure could not be maintained. Furthermore, if the finishing tool (21) was not extended out to the position shown in FIG. 1, but instead was more in the position shown in U.S. Pat. No. 3,099,299 then the outer edges (30) of the front plate (14) would interfere with the edge (28) as the trimming of radius edge (28) is being done. The rightmost outer edge (30) is in line with the vertical dashed line (31) closest to the letter "y" (FIG. 1). Consequently, the extension (19) on fixture (15) not only provides a clearance between the edge (28) and the edges of the plate (14), but the fact that the end of (18) at (19) can be positioned along the edge (28), guides the finishing tool (21) in an appropriate fashion.

Obviously many modifications and variations of the present invention are possible in light of the above teachings. It is therefore to be understood that, within the scope of the appended claims, the invention may be practiced otherwise than as specifically described.

I claim:

1. Apparatus comprising:
   a router housing having a front surface with an outer edge thereon;
   a finishing tool having a cylindrical guide surface on one end thereof disposed around a longitudinal axis of said finishing tool, said finishing tool having a cutting edge thereon adjacent to said cylindrical guide surface;
   means for selectively holding the other end of said finishing tool;
   means disposed at least partially within said housing for selectively rotating the holding means and the finishing tool about the longitudinal axis of the finishing tool;
   fixture means for permitting said one end of said finishing tool to be movable along a radius edge of a countertop for trimming an edge off of such countertop, said fixture means including a base member adapted to be attached to said front surface of said router housing and a central flange rigidly connected to said base member and extending from said base member toward said one end of said finishing tool, an opening disposed in a central portion of said base member and extending through a central portion of said central flange, said central flange having a rounded front end thereon adjacent to the cutting edge of said finishing tool, the distance of said rounded front end of said central flange from said front surface of the router housing being greater than the distance of the outer edge of said front surface of the router housing from the longitudinal axis of said finishing tool, whereby there will be a clearance between the outer edge of the front surface of the router housing and the countertop when the rounded front end of the central flange is moved along the radius edge of the countertop while the cylindrical guide surface is on top of the countertop and the cutting edge trims off a portion of the top front edge of the countertop; and
   means for connecting said fixture means to the front surface of said router housing.

2. The apparatus of claim 1 wherein the radius of curvature of said rounded front end of the central flange is substantially less than the radius of curvature of the radius edge of the countertop to be trimmed.

* * * * *